United States Patent [19]

Bloch

[11] 3,813,827
[45] June 4, 1974

[54] CHUCK ASSEMBLY
[75] Inventor: Eric F. Bloch, Orange, Conn.
[73] Assignee: Eldorado Tool & Manufacturing Corporation, Milford, Conn.
[22] Filed: May 25, 1973
[21] Appl. No.: 364,149

[52] U.S. Cl.................. 51/219 R, 279/61, 408/240
[51] Int. Cl............................................. B24b 3/24
[58] Field of Search............ 279/60, 61, 62, 63, 64, 279/65; 51/219 R; 408/240

[56] References Cited
UNITED STATES PATENTS
3,044,790   7/1962   Stoner................................. 279/61

Primary Examiner—Francis S. Husar
Attorney, Agent, or Firm—Spencer T. Smith

[57] ABSTRACT

A chuck assembly comprising a body portion including a cylindrical bore and two body recesses obliquely intersecting the cylindrical bore, a pair of jaws including threaded portions located within the recesses, means for conjointly displacing the jaws along and toward and away from the axis of the cylindrical bore from a first advanced position to a second retracted position, a locator independently, slidably axially displaceable along the central bore from a first advanced position whereat the forward end of the locator will be proximate the forward ends of the advanced jaws to a second retracted position whereat the forward end of the locator will be proximate the forward ends of the retracted jaws, means for maintaining the locator at a predetermined radial location, and means for maintaining the locator at a predetermined angular orientation.

7 Claims, 5 Drawing Figures

PATENTED JUN 4 1974 3,813,827

CHUCK ASSEMBLY

The present invention relates to gundrill grinding attachments and more particularly to a master chuck assembly for mounting a gundrill on a gundrill grinding attachment.

Gundrils cannot be accurately and repetitively sharpened by manual manipulation of the drill. The critical character of the relationships between the oil clearance space and the configuration and orientation of the primary and secondary clearances of the inner and outer cutting edges of the gundrill dictate that gundrill grinding attachments, such as disclosed in U.S. Pat. No. 3,132,453 be utilized to assure the existence of the desired relationships.

In the gundrill grinding attachment disclosed in the above-identified patent, a master liner having a peripheral flange is slidingly inserted into a longitudinal bore of a hollow spindle and is maintained at a desired location and orientation by a set screw. The master liner has a selectively oriented radial locator and a bushing type insert having a longitudinal slit is slwdwngly inserted into the master liner with the radial locator projecting through this slot whereby the bushing type insert is properly oriented. A set screw extends through the master liner and the bushing type insert and engages one of the walls of the flute of a gundrill thereby clamping the gundrill after it has been slidably positioned at a predetermined location and rotated to a selected orientation within the bushing type insert.

Utilization of such a prior art master liner bushing insert (master collet / collet insert) system requires tools for tightening and loosening the set screw to effectively clamp the gundrill and such tightening may result in the puncturing of the gundrill shank or the cracking of the carbide gundrill tip. Additionally, in such a prior art sytem, each differently sized gundrill requires a separate collet insert.

Accordingly, it is an object of the present invention to provide a device for use with gundrill grinding attachments to spcurely hold and properly orient a gundrill prior to sharpening wherein a single such device can be utilized to hold a broad range of gundrills.

Another object of the present invention is to provide such a device which will hold a gundrill more firmly than the prior art master collet — collet insert system while substantially eliminating the possibility of damaging the gundrill as a result of the application of undue force.

Among the advantages of the present invention is the provision of a gundrill holding and orienting device which can be rapidly utilized without the utilization of any tools or the like.

Other objects and advantages of the present invention will become apparent from the following portion of this specification and from the accompanying drawings which illustrate in accordance with the mandate of the patent statutes presently preferred embodiments incorporating the principles of the invention.

Referring to the drawings.

Figure 2:
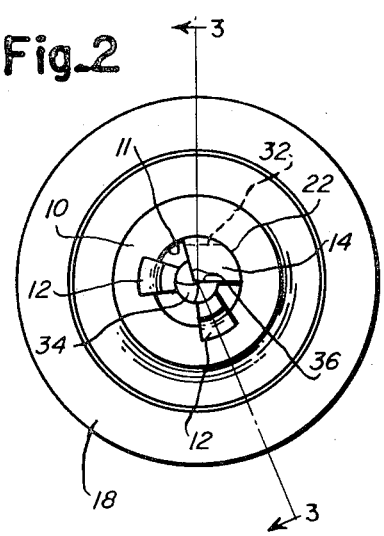
FIG. 2 is a view of the master chuck assembly illustrated in FIG. 1 taken along lines 2—2 thereof.
Figure 1:
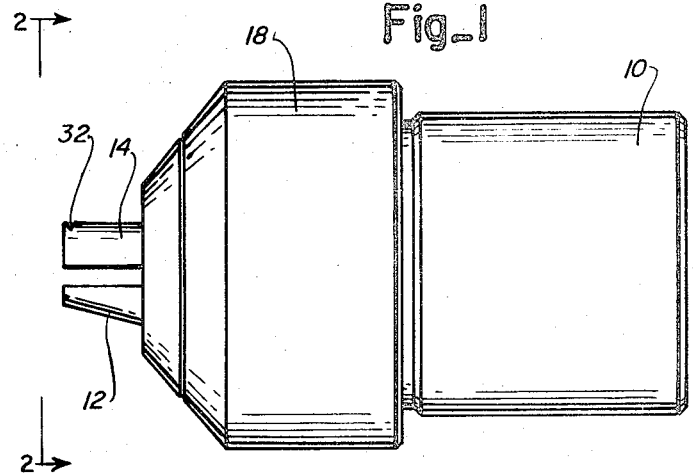
FIG. 1 is an elevational view of a master chuck assembly having a first preferred embodiment made in accordance with the teachings of the present invention.
Figure 3:
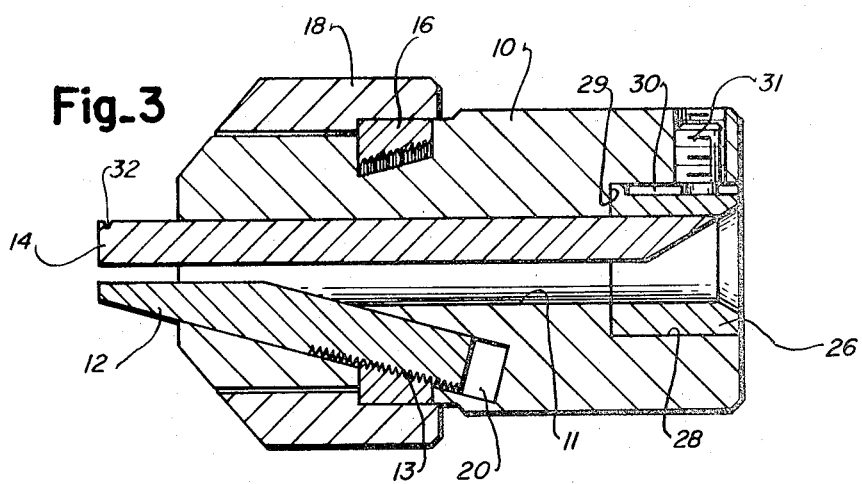
FIG. 3 is a cross-sectional view of the master chuck assembly illustrated in FIG. 2 taken along the lines 3—3 thereof with the gundrill removed from the chuck.

The master chuck, which is illustrated in FIGS. 1, 2 and 3 of the drawings includes a body 10 having a central bore 11, a pair of jaws 12 having threaded surface portions 13, a locator 14, and a threaded nut 16, which is of two piece construction and suitably secured to a sleeve member 18. Rotation of the sleeve member 18 and the threaded nut 16, which is secured thereto, effects the oblique displacement of the jaws 12 in associated inclined body recesses 20 along and toward and away from the axis of the central bore 11. The locator 14 includes a cylindrical portion 22 which mates with the central bore wall and is independently and freely slidably displaceable along the mating central bore 11. The locator 14 is secured to an annular member 26 having an inner diameter substantially equal to the diameter of the central bore of the master chuck body. The annular member is slidingly displaceable within a second coaxial bore 28 having a diameter greater than the diameter of the central bore 11. The locator 14 will thereby be maintained in sliding, mating engagement with the central bore wall as it is axially displaced towards or away from the front of the master chuck. Forward axial displacement of the annular member, and hence, the locator is limited by the bottom 29 of the second bore 28. An axially extending recess or keyway 30 is defined in the outer periphery of the annular member 26 and this keyway has a width selected so that a set screw 31 which extends through the body 10 and into the keyway 30 will slidingly engage either side thereof whereby the angular orientation of the annular member and the locator will be established and maintained. If desired, once the axial location of the locator has been established, the set screw may be tightened to maintain the desired axial location of the locator. The keyway terminates short of the bottom 29 of the second bore and the set screw 31 acts as a second stop, limiting the rearward axial displacement of the annular member and the locator.

The total displacement of the annular member between the two stops is choosen so that the locator 14 can be axially displaced from an outer position proximate the axially advanced jaws 12 of the master chuck for holding the smallest gundrill intermediate the jaws and the locator and a second or inner position proximate the axially retracted jaws for holding the largest gundrill intermediate the jaws and the locator. A notch 32 may be defined in the locator to enable its displacement by means of fingernail engagement or the like.

A gundrill 34 has an obtuse longitudinally extending flute which must be precisely located and oriented and, accordingly, the locator 14 includes an obtuse portion 36 for matingly engaging with the gundrill flute. When the jaws which are angularly spread approximately 120° on either side of the locator are tightened about a gundrill, the forces applied by the jaws will urge the locator into mating engagement with the gundrill flute. The gundrill will, accordingly, be precisely held and oriented within the master chuck.

Figure 4:
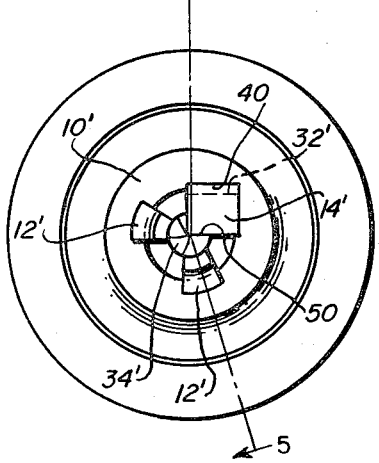
FIG. 4 is a view similar to that of FIG. 2 of a master chuck assembly having a second preferred embodiment.
Figure 5:
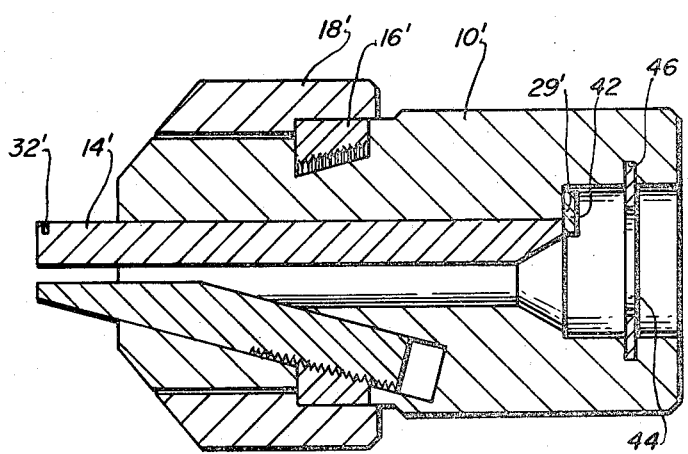
FIG. 5 is a cross-sectional view of the master chuck assembly illustrated in FIG. 4 taken along the lines 5—5 thereof.

In the second preferred embodiment illustrated in FIGS. 4 and 5, a square axially extending bore 40 is broached into the body of the master chuck for slidably receiving a locator 14' (of square cross-section in the illustrated embodiment). The broached bore is selectively located so that two full sides and at least a portion of each of the remaining two sides of the locator will matingly engage this broached bore. The precise location and orientation of the locator will accordingly be assured.

A stop 42 is secured to the end of the locator 14' and the engagement of the stop and the bottom 29° of the second bore limits the forward displacement of the locator. A snap ring 44 positioned in a concentric channel 46 limits the rearward displacement of the locator.

Since one flute wall 50, which is to engage the locator, extends radially past the center of the gundrill, and since the jaws 12' and locator 14' are located in a triangulated pattern, tightening of the jaws results in the one flute wall 50 forcefully engaging with one side of the locator with the corner of the locator being forced into the base of the flute. The gundrill will accordingly be precisely located. If desired, the exposed gundrill engaging edge of locator could be defined to matingly engage the gundrill flute in a manner illustrated with regard the first embodiment. Having thus described the invention, what is claimed is:

1. A chuck assembly comprising
   a body portion including a cylindrical bore and two body recesses obliquely intersecting said cylindrical bore,
   a pair of jaws including threaded portions located within said recesses,
   means for conjointly displacing said jaws along and toward and away from the axis of said cylindrical bore from a first advanced position to a second retracted position,
   a locator independently, slidably axially displaceable along said central bore from a first advanced position whereat the forward end of said locator will be proximate the forward ends of said advanced jaws to a second retracted position whereat the forward end of said locator will be proximate the forward ends of said retracted jaws,
   means for maintaining said locator at a predetermined radial location, and
   means for maintaining said locator at a predetermined angular orientation.

2. A chuck assembly according to claim 1, further comprising means for preventing the forward displacement of said locator beyond said advanced position and means for preventing the rearward displacement of said locator beyond said retracted position.

3. A chuck assembly according to claim 1, further comprising notch means defined in the forward end of said locator to facilitate manual manipulation thereof.

4. A chuck assembly according to claim 1, wherein said locator includes a first axially extending portion selectively configured for mating engagement with the wall of said cylindrical bore and a second axially extending portion selectively configured for mating engagement with the flute of a gundrill.

5. A chuck assembly according to claim 4, wherein said body portion includes a second coaxial cylindrical bore at the rearward end of said first cylindrical bore further comprising an annular member selectively sized for mating, sliding engagement with the wall of said second cylindrical bore and adapted to be secured to said locator whereby the predetermined radial position of said locator will be maintained.

6. A chuck assembly according to claim 5, wherein said annular member includes an axially extending recess defined in the outer periphery thereof and wherein a set screw passes through said body portion and is selectively sized to enter said axially extending recess and for engaging with the walls thereof to maintain the angular orientation of said annular member.

7. A chuck assembly according to claim 1, wherein said locator is of substantially square cross-section and said body portion including an axially extending locator receiving bore selectively located so that two full sides of said locator and a portion of the remaining two sides of said locator matingly engage with said locator receiving bore.

* * * * *